United States Patent
Limbacher et al.

(10) Patent No.: US 11,767,025 B2
(45) Date of Patent: Sep. 26, 2023

(54) METHOD FOR OPERATING A MOTOR VEHICLE HAVING AN AUTOPILOT SYSTEM, AND MOTOR VEHICLE

(71) Applicant: AUDI AG, Ingolstadt (DE)

(72) Inventors: Reimund Limbacher, Ingolstadt (DE); Daniel Lepczyk, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 532 days.

(21) Appl. No.: 16/978,526

(22) PCT Filed: Mar. 4, 2019

(86) PCT No.: PCT/EP2019/055263
§ 371 (c)(1),
(2) Date: Sep. 4, 2020

(87) PCT Pub. No.: WO2019/170576
PCT Pub. Date: Sep. 12, 2019

(65) Prior Publication Data
US 2021/0016789 A1   Jan. 21, 2021

(30) Foreign Application Priority Data
Mar. 7, 2018   (DE) .................. 10 2018 203 426.5

(51) Int. Cl.
*B60W 50/14* (2020.01)
*B60W 60/00* (2020.01)
(Continued)

(52) U.S. Cl.
CPC ............. *B60W 50/14* (2013.01); *B60K 35/00* (2013.01); *B60W 40/09* (2013.01);
(Continued)

(58) Field of Classification Search
CPC ............. B60W 50/14; B60W 60/0057; B60W 60/0051; B60W 40/09; B60W 2556/50;
(Continued)

(56) References Cited

U.S. PATENT DOCUMENTS 9,132,913 B1 *  9/2015  Shapiro ................ G08G 5/0086
9,188,985 B1    11/2015  Hobbs et al.
(Continued)

FOREIGN PATENT DOCUMENTS

CN    104837705 A    8/2015
CN    105324636 A    2/2016
(Continued)

OTHER PUBLICATIONS

Xue et al., "Design and Research of Human-Computer Interaction Interface in Autopilot System of Aircrafts," 2009, Publisher: IEEE.*
(Continued)

*Primary Examiner* — Tuan C To
(74) *Attorney, Agent, or Firm* — Sterne, Kessler, Goldstein & Fox P.L.L.C.

(57) ABSTRACT

Described is an approach for operating a motor vehicle, which has an autopilot system designed for completely automatically guiding the motor vehicle, in which technical activatability information is determined depending on driving situation data and/or operating state data of the motor vehicle and system boundaries information describing the range of application of the autopilot system. The motor vehicle also has a display device with a first output element displaying the activatability of the autopilot system according to the technical activatability information. Driver-related recommendation information is determined depending on the operating situation and on preferences in relation to the autopilot system and/or driver data describing the status of the driver in relation to the vehicle guidance. On this basis,
(Continued)

a second output element of the display device displays an activation recommendation and/or a deactivation recommendation.

17 Claims, 3 Drawing Sheets

(51) Int. Cl.
*B60W 40/09* (2012.01)
*B60K 35/00* (2006.01)
*B60W 50/00* (2006.01)

(52) U.S. Cl.
CPC .... *B60W 60/0051* (2020.02); *B60W 60/0057* (2020.02); *B60K 2370/172* (2019.05); *B60K 2370/175* (2019.05); *B60K 2370/182* (2019.05); *B60W 2050/0075* (2013.01); *B60W 2050/146* (2013.01); *B60W 2540/229* (2020.02); *B60W 2556/10* (2020.02); *B60W 2556/50* (2020.02)

(58) Field of Classification Search
CPC ...... B60W 2540/229; B60W 2050/146; B60K 35/00; B60K 2370/175; B60K 2370/182; B60K 2370/172
USPC .......................................................... 701/36
See application file for complete search history.

(56) References Cited

U.S. PATENT DOCUMENTS

| | | | |
|---|---|---|---|
| 10,926,408 B1* | 2/2021 | Vogelsong | B25J 9/1671 |
| 11,150,653 B1* | 10/2021 | Fannin | B64D 45/00 |
| 2003/0081757 A1* | 5/2003 | Mengshoel | H04M 3/5233 |
| | | | 379/265.06 |
| 2007/0063834 A1* | 3/2007 | Bozzone | G05D 1/0022 |
| | | | 340/539.1 |
| 2013/0041548 A1 | 2/2013 | Kraulter et al. | |
| 2014/0156133 A1 | 6/2014 | Cullinane et al. | |
| 2014/0365035 A1* | 12/2014 | Hindman | F42B 15/01 |
| | | | 701/3 |
| 2015/0019047 A1* | 1/2015 | Chandrashekarappa | G08G 5/0021 |
| | | | 701/3 |
| 2015/0051781 A1* | 2/2015 | Schnieders | B60W 30/12 |
| | | | 701/23 |
| 2015/0088375 A1 | 3/2015 | Lee et al. | |
| 2015/0094899 A1* | 4/2015 | Hackenberg | B60K 28/14 |
| | | | 701/23 |
| 2015/0344040 A1 | 12/2015 | Heckmann et al. | |
| 2016/0093211 A1 | 3/2016 | Giester et al. | |
| 2016/0231743 A1 | 8/2016 | Bendewald et al. | |
| 2017/0108868 A1* | 4/2017 | Johnson | G05D 1/0206 |
| 2017/0227963 A1* | 8/2017 | Klinger | G01S 7/006 |
| 2017/0334459 A1* | 11/2017 | Mcnew | B60W 50/14 |
| 2018/0026705 A1* | 1/2018 | Parks | H04B 7/18506 |
| | | | 701/2 |

FOREIGN PATENT DOCUMENTS

| | | | | |
|---|---|---|---|---|
| DE | 10326593 | A1 | 12/2004 | |
| DE | 102006057153 | A1 | 6/2007 | |
| DE | 102012219923 | A1 | 4/2014 | |
| DE | 102012023245 | A1 | 6/2014 | |
| DE | 102013008605 | A1 | 11/2014 | |
| DE | 102013227133 | A1 | 3/2015 | |
| DE | 102014221132 | A1 | 4/2016 | |
| DE | 102015004469 | A1 | 8/2016 | |
| DE | 102015223656 | A1 | 6/2017 | |
| EP | 2531814 | B1 | 12/2012 | |
| EP | 3187952 | A1 * | 7/2017 | ............. B63H 25/04 |
| EP | 3260331 | A1 * | 12/2017 | ............. B60K 35/00 |
| WO | WO 2015/049231 | A1 | 4/2015 | |
| WO | WO-2016109832 | A2 * | 7/2016 | ............. B63B 49/00 |

OTHER PUBLICATIONS

International Preliminary Report on Patentability directed to related International Patent Application No. PCT/EP2019/055263, dated Sep. 8, 2020, with attached English-language translation; 14 pages.
International Search Report and Written Opinion of the International Searching Authority directed to related International Patent Application No. PCT/EP2019/055263, dated Jun. 7, 2019, with attached English-language translation; 15 pages.

* cited by examiner

METHOD FOR OPERATING A MOTOR VEHICLE HAVING AN AUTOPILOT SYSTEM, AND MOTOR VEHICLE

TECHNICAL FIELD

The disclosure relates to a method for operating a motor vehicle.

BACKGROUND

WO 2015/049231 A1 relates to a method for a driver assistance system of a vehicle which is supposed to be designed to control the vehicle at least partially automatically. For this purpose, a beginning of an autopilot road section is determined in a route planned for the vehicle, along which the driver assistance system can control the vehicle automatically. A distance between the current position of the vehicle and the beginning of the autopilot road section is determined and output in the vehicle, wherein said distance can be output as a kilometer specification, as a graphical representation of the planned route, or as a time span until the autopilot road section is reached. An instrument cluster displays whether and for how long the autopilot function is available. This means that in this document, technical activatability information is also determined for the future.

DE 10 2014 221 132 A1 relates to a method and a device for displaying the availability of a first driving mode of a vehicle. In the first driving mode, the vehicle is guided at least partially automatically. A beginning of a road section, in which the first driving mode is available, is predicted from environmental data of the surroundings of the vehicle. The predicted beginning of the road section is shown on a display element, wherein it is also possible to indicate the predicted beginning and/or the predicted end of the road section.

EP 2 531 814 B1 relates to a driver assistance system and a method for driver assistance, in which the complexity of an upcoming road section is used to check whether largely automatic vehicle guidance is possible, so that the driver can carry out a tertiary task or tertiary activity.

Such technical availability displays for autopilot systems have various disadvantages. Particularly in the case of activatability information based on the current operating situation, frequently changing availability displays are thus output, so that there is a risk that, at a certain point in time, the driver no longer pays attention to the display. Such availability displays are, in any case, often only of short duration, so that a meaningful use of the piloted driving function is difficult for the driver to predict, although the suggestions cited at the beginning and indicating the duration of the availability can be useful here.

A further disadvantage of the availability display based on activatability information is that it is also output at times when the driver is not interested in using the piloted driving function of the autopilot system. However, in other operating situations, no availability is displayed, although a use of the piloted driving function is currently desired and would also be possible with a slightly altered driving style.

DETAILED DESCRIPTION

Figure 1:
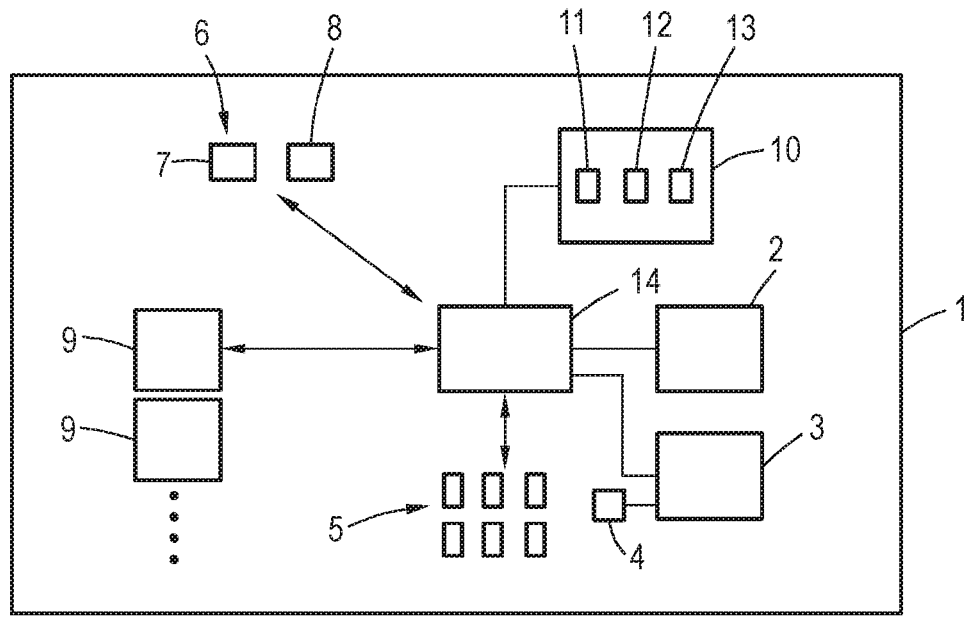
FIG. 1 shows a schematic diagram of a motor vehicle according to the disclosure.

The disclosure relates to a method for operating a motor vehicle, which has an autopilot system designed for completely automatically guiding the motor vehicle, in which technical activatability information is determined depending on a current and/or upcoming operating situation described by driving situation data and/or operating state data of the motor vehicle and system boundaries information describing the range of application of the autopilot system, wherein the motor vehicle also has a display device with a first output element displaying the activatability of the autopilot system according to the technical activatability information. The disclosure also relates to a motor vehicle.

Systems for partially and, particularly, completely automatically guiding a motor vehicle are an important research subject for a further assistance for drivers. Various piloted driving functions for road-bound motor vehicles have already been proposed, which can be provided by autopilot systems which are designed for completely automatically guiding the motor vehicle. One example is the so-called "traffic jam pilot," which can completely take over vehicle guidance in operating situations with slow traffic. Other such driving functions include, for example, a highway pilot and a city pilot.

Such piloted driving functions or autopilot systems cannot be activated in all operating situations in which a motor vehicle may be in because, for example, a traffic jam pilot is supposed to be limited to traffic jam situations, and a highway pilot is supposed to be limited to highways with corresponding speed ranges. The ranges of application of such autopilot systems are therefore described by system boundaries which can be stored by corresponding system boundaries information.

For example, due to the design of the traffic jam pilot, there are various technical reasons for activation prevention, among others, that no vehicle in front was recognized, that no lane markings were recognized, that the vehicle in front was driving faster than 60 km/h, that an incorrect road class (no highway) is present, that pedestrians in the surroundings were recognized, that there is a toll station ahead, and the like.

In order to prevent the driver from trying to activate an autopilot system, although there are technical obstacles due to its system boundaries, it was proposed to use the current and/or upcoming operating situation described by driving situation data and/or operating state data of the motor vehicle and the system boundaries information to determine technical activatability information which can be output on a display device of the motor vehicle using an output element. In particular, the driver is informed that a state has been reached in which no technical reason for activation prevention is present. This can be achieved, for example, by a "Traffic jam pilot: available" text display, a backlit symbol, or the like.

WO 2015/049231 A1 relates to a method for a driver assistance system of a vehicle which is supposed to be designed to control the vehicle at least partially automatically. For this purpose, a beginning of an autopilot road section is determined in a route planned for the vehicle, along which the driver assistance system can control the vehicle automatically. A distance between the current position of the vehicle and the beginning of the autopilot road section is determined and output in the vehicle, wherein said distance can be output as a kilometer specification, as a graphical representation of the planned route, or as a time span until the autopilot road section is reached. An instrument cluster displays whether and for how long the autopilot function is available. This means that in this document, technical activatability information is also determined for the future.

DE 10 2014 221 132 A1 relates to a method and a device for displaying the availability of a first driving mode of a vehicle. In the first driving mode, the vehicle is guided at least partially automatically. A beginning of a road section, in which the first driving mode is available, is predicted from environmental data of the surroundings of the vehicle. The predicted beginning of the road section is shown on a display element, wherein it is also possible to indicate the predicted beginning and/or the predicted end of the road section.

EP 2 531 814 B1 relates to a driver assistance system and a method for driver assistance, in which the complexity of an upcoming road section is used to check whether largely automatic vehicle guidance is possible, so that the driver can carry out a tertiary task or tertiary activity.

Such technical availability displays for autopilot systems have various disadvantages. Particularly in the case of activatability information based on the current operating situation, frequently changing availability displays are thus output, so that there is a risk that, at a certain point in time, the driver no longer pays attention to the display. Such availability displays are, in any case, often only of short duration, so that a meaningful use of the piloted driving function is difficult for the driver to predict, although the suggestions cited at the beginning and indicating the duration of the availability can be useful here.

A further disadvantage of the availability display based on activatability information is that it is also output at times when the driver is not interested in using the piloted driving function of the autopilot system. However, in other operating situations, no availability is displayed, although a use of the piloted driving function is currently desired and would also be possible with a slightly altered driving style.

Therefore, the disclosure addresses the problem of providing an improved display concept for piloted driving functions of an autopilot system in motor vehicles.

In order to solve this problem, it is provided, according to the disclosure, in a method of the initially described type that, in addition to the technical activatability information, driver-related recommendation information is determined depending on the operating situation and on preferences in relation to the autopilot system and/or driver data describing the status of the driver in relation to the vehicle guidance, on which basis a second output element of the display device displaying an activation recommendation and/or a deactivation recommendation according to the recommendation information is controlled.

It is therefore proposed that, in addition to the technical activatability information, driver-related recommendation information is determined, which describes at least one activation recommendation for the piloted driving function or a deactivation recommendation for the piloted driving function. In addition to the technical activatability information, this can be displayed via at least one corresponding, second output element of the display device. This means that a distinction is made between technical availability criteria, described by the system boundaries information, and additional, driver-related and situation-specific criteria in order to also allow for a display of the availability on the basis of the situationally meaningful suitability. In this way, for example, visual and/or acoustic activation recommendations or deactivation recommendations can be made available and output in particularly useful situations.

The result is a multi-level availability display with additional usage recommendations for the piloted driving function of the autopilot system, wherein, in addition to the operating state data describing the operating situation and driving situation data for the technical activatability information, the system boundaries information and the situational information on the current driver state or the previous usage behavior of the driver or other drivers for the driver-related recommendation information are combined in comparable situations.

It is expedient if an activation recommendation is only displayed for road sections, for which the range of application of the autopilot system is available according to the activatability information. This means that an activation recommendation is only output if the piloted driving function of the autopilot system can also be activated, so as not to confuse the driver. Accordingly, it can be provided that a deactivation recommendation is only output if the piloted driving function of the autopilot system is also active.

Prediction data, particularly predictive road data, relating to an upcoming road section are particularly preferably used as driving situation data and/or operating state data. In this way, technical activatability information and driver-related recommendation information can also be determined for road sections lying in front of the motor vehicle, wherein such predictive road data can be obtained from various sources. For example, it is conceivable to obtain predictive road data at least partially from a navigation system of the motor vehicle, be it by analyzing the road currently being traveled and/or on the basis of an already predetermined route that the motor vehicle is following, wherein additional historical data on preferred roads/routes of the driver can also be used to predict the future path of the motor vehicle if no predetermined route is present. The use of digital map material from a navigation system has the particular advantage that the road sections or road segments recorded therein can be assigned additional information or attributes, from which, together with the system boundaries information and the driver data, appropriate conclusions can be drawn for determining the technical activatability information or the driver-related recommendation information. However, such additional information can also be determined if the predictive road data are at least partially derived from sensor data from environmental sensors of the motor vehicle, comprising, for example, the sensor data of a camera directed at the area in front of the motor vehicle. From such sensor data, it is not only possible to derive the future route, but it is also conceivable to obtain additional information about said future route. For this purpose, predictive road data of the navigation system and predictive road data, which were derived from sensor data of the motor vehicle, are particularly preferably combined in order to obtain current additional information on upcoming road sections. Further sources for additional information on currently traveled and/or upcoming road sections are also traffic information that can be provided, for example, via radio stations and/or the Internet. Finally, useful driving situation data that describe the operating situation also include weather information that can also be obtained from sensor data from environmental sensors of the motor vehicle and/or via corresponding communication connections, particularly the Internet. Operating state data of the motor vehicle can be obtained, for example, from operating sensors and/or from other information sources within the motor vehicle, particularly from control devices, which, in addition to current dynamic information of the motor vehicle, naturally comprise currently active vehicle systems and their parameters as well as other control information.

Options for determining the technical activatability information, particularly also for upcoming road sections, are basically known in the prior art, as was described at the beginning by way of example, and can also be used in the context of the present disclosure. For example, in order to determine the technical activatability information, a comparison can be made with corresponding system boundaries information, for example, regarding the speed of the motor vehicle and a permissible speed range of the piloted driving function of the autopilot system. However, more complex criteria and/or evaluations are naturally also conceivable, for example, with regard to the complexity of the driving situation.

The driver data can preferably be driver-specific or at least motor vehicle-specific as far as the driver data describing the preferences of the driver are concerned. Specifically, it can be provided that the driver is identified at the beginning of the journey, for example, using a driver-specific key, biometric data and/or a user input. A driver profile with corresponding driver data relating to the preferences of the driver with regard to the piloted driving function of the autopilot system can then be assigned to the driver and stored accordingly. Corresponding options have been described in a variety of ways in the prior art, for example, with regard to the setting of safety systems and/or driving dynamics systems for a current driver.

In an advantageous development of the present disclosure, it can be provided that the activatability information and/or the recommendation information are determined and comprise at least one time information, particularly a time information describing an activatability beginning and/or an end of the range of application or a time/place of a recommendation. For this purpose, it must be noted that the time information can also be spatial information, for example, a distance or location, which can be converted accordingly into a time specification (and vice versa), as shown in the documents cited above, so that, for example, if the length of a road section, on which the piloted driving function can be used, is known, it can be estimated for how long the piloted driving function can probably be active. In this way, relevant additional knowledge, particularly using predictive road data, is generated and preferably also passed on to the driver.

Accordingly, it is preferred if the time information and/or an output information derived therefrom, particularly an expected extent of the range of application and/or a duration up to an activatability and/or activation recommendation and/or deactivation recommendation, is output by means of the display device. For example, in addition to a symbol and/or text that stands for the basic technical activatability, corresponding time information or output information derived therefrom can be displayed with regard to the technical activatability information, for example, "Autopilot available: in 10 minutes" or "Autopilot available: for 17 km." The same can be provided with regard to the recommendation information, so that, for example, the following can be displayed: "Autopilot activation recommended. The meaningful usage time is 10 minutes/20 km." An autopilot display for the remaining driving time is particularly expedient, wherein the time information and/or the output information can also be provided as an interval, for example, as "2 to 3 minutes," especially in the case of an estimate.

Particularly advantageously, in the recommendation information, a degree of recommendation can be associated with an activation recommendation and/or a deactivation recommendation, which makes it possible to assign the corresponding recommendation to a recommendation level, so that the output of activation recommendations and deactivation recommendations can also be expediently graded. In a particularly preferred embodiment, it is therefore provided that the recommendation information comprises at least one recommendation level describing a degree of recommendation, on the basis of which the output of the activation recommendation is adapted, i.e., different second output elements and/or output control parameters are particularly associated with different recommendation levels. In an expedient concrete embodiment, a road section-related activation recommendation determined on the basis of a driver-related suitability of a road section can be assigned a lower recommendation level than an actuality-related activation recommendation related to a current activity and/or a current state of the driver. In such case, actuality-related activation recommendations are preferably more clearly perceptible and/or output for a shorter time, since they relate to current information, particularly to a current event. Of course, two activation recommendations and/or deactivation recommendations of different recommendation levels can also be present simultaneously. Here, for example, the recommendation with a lower recommendation level can be displayed permanently on a second output element and the recommendation with a higher level of recommendation can be briefly displayed via a further second output element, for example, an acoustic output means. This is particularly expedient in the case of actuality-related recommendations, since these may refer to a temporary state.

In an advantageous development of the disclosure, it can be provided that an activation recommendation and/or a deactivation recommendation is displayed at least at the beginning of a road section, to which it refers. This means that an activation recommendation and a deactivation recommendation can be output in a meaningful context directly and intuitively comprehensible for the driver, wherein in the case of an additional advance and/or permanent display of an activation recommendation and/or deactivation recommendation, the output is provided at the beginning of the corresponding road section by highlighting the already existing output, for example, a flashing transition from an advance indication to a permanent activation recommendation for the road section, and/or by an additional output. In addition to such a grading within an activation recommendation and/or deactivation recommendation, a recommendation with a lower degree of recommendation can, in the case of different recommendation levels, also be output permanently, while the recommendation with a higher degree of recommendation, particularly an actuality-related recommendation, can also be output briefly at the beginning of the road section, particularly more noticeably.

As already mentioned, an output of an activation recommendation and/or a deactivation recommendation via the second output element is preferably only generated when the technical activatability criteria are also met. The result is that, in addition to the display of the technical activatability, an additional output is provided if there are indications that a piloted driving function would also be desirable or meaningful for the current driver in the current operating situation.

In particular, the activation recommendation and, conversely, the deactivation recommendation are output when a driver-related, situationally meaningful activation state is reached. In addition, it is preferred if the display of an activation recommendation, particularly an actuality-related activation recommendation, is output in a manner limited to a predetermined period of time, for example, 5 s. In this way, the attention of the driver is attracted at the beginning of the road section on which the activation is meaningful overall, but said driver is not further distracted by the display. Preferably, this takes place in the case of recommendations with a higher degree of recommendation.

A particularly advantageous embodiment of the disclosure provides that the second output element comprises an acoustic output means, via which the activation recommendation is output acoustically. For this purpose, a visual and an additional acoustic output are particularly conceivable. As soon as there are indications that, in the current operating situation, the piloted driving function would be particularly useful for the current driver and/or the piloted driving function would better be deactivated, an acoustic signal can be provided by a voice output, for example, "Would you like to activate the highway pilot now?" This is particularly expedient if background information, as shall be explained in more detail below, is also supposed to be output because then, an apparently sympathetic, thinking conversation partner is simulated. In a specific embodiment, a recommendation of a higher degree of recommendation to be output at least acoustically and/or more noticeably can be added, particularly for a short period of time, to a continuously visually output activation recommendation of a lower degree of recommendation.

In this context, it is also particularly advantageous if, in the case of an acoustic output, a response from the driver is recorded with an acoustic recording means and used to derive control information for the autopilot system, particularly for activating or deactivating the autopilot system. While it can naturally still be possible to provide the piloted driving function via corresponding manually operated operating means, it is particularly preferred if a voice output for an activation recommendation or a deactivation recommendation takes place, including a voice response from the driver via a suitable recording means, for example, an interior microphone, which can be present in a hands-free system, in order to make a corresponding activation request by the driver as easy as possible to enter. If the voice output includes, for example, "Would you like to activate the piloted driving function now?" a "yes" response from the driver can result in the generation of corresponding activating control information and the use thereof in the autopilot system.

In a particularly preferred embodiment of the method according to the disclosure, in the case of an activatability information which does not indicate activatability but a recommendation information which indicates an activation recommendation, it can be checked by evaluating the operating situation whether at least one recommendable driving intervention by the driver leads to the establishment of the activatability, wherein, with a determinable recommendable driving intervention, driver information describing said intervention is output via the second output element and/or a further output element. The at least one driver intervention can relate particularly to a lane change and/or a change in a road class and/or a speed change, particularly a reduction in speed, wherein a route comprising the target road class is determined and recommended, particularly in the event of a road class change using a navigation system of the motor vehicle. Such an embodiment can also be based on recommendation levels, so that, for example, such a check for recommendable driving interventions is only carried out in case of activation recommendations of a higher degree of recommendation. If, for example, the system boundaries information describes the use of the piloted driving function only on specific lanes of a road and the motor vehicle moves in a correspondingly impermissible lane, so that the technical activatability information indicates that the piloted driving function cannot be activated, particularly acoustically and/or visually as text and/or a graphic, a corresponding message is output as recommendation information, for example: "To activate the highway pilot, please first switch to the right lane." The same applies to road classes that are not permitted for the piloted driving function, so that, for example, activation of a highway pilot as a piloted driving function is not possible on a country road. In this case, a message can also be output, for example, "To activate the highway pilot, please select an alternative route via the highway." In a particularly preferred embodiment, there can be an interaction with the navigation system of the motor vehicle, which, for example, can determine and suggest an alternative route by using the permissible road class, e.g., the highway.

A further example of a recommendation information is constituted if the motor vehicle currently exceeds a maximum speed for the use of the piloted driving function in accordance with system boundaries information, for example, it is driving faster than 130 km/h in case of an autopilot. Here, for example, a message such as "To activate the highway pilot, please first reduce the driving speed to below 130 km/h" can be output.

A particularly advantageous embodiment is also obtained if the recommendation information comprises a background information describing the reason for an activation recommendation and/or a deactivation recommendation, and the background information is output with the respective recommendation. The reason for the recommendation messages can therefore also be provided, for example, "You could use it to process your e-mails comfortably and safely" or "We will shortly be entering a tunnel." In this way, the driver can easily comprehend why an activation or deactivation recommendation is provided at precisely this moment. A kind of "aha effect" can thus be achieved for the driver, and said driver gets the impression that the autopilot system "is thinking," so to speak.

For the specific determination of the recommendation information, a plurality of configurations are conceivable, which can be additionally realized and used, particularly advantageously, jointly in order to be able to decide as precisely as possible for the, particularly current, driver, how situationally meaningful the use of the piloted driving function would currently be for the driver.

In a first specific embodiment, it can be provided that the recommendation information is determined by evaluating historical data describing the driver behavior in the past. This means that it is analyzed how particularly the current driver, but possibly also other drivers, behaved in the past with respect to the autopilot system in different operating situations, wherein such historical data need not necessarily, but can, be limited to the motor vehicle owned by said driver. In this way, the system described herein can adapt to the driver and anticipate the preferences of said driver regarding the autopilot system and its piloted driving function, particularly with reference to the current driver. Corresponding historical data can be collected, for example, within the motor vehicle itself by collecting activation and deactivation events, particularly also in response to output activation and deactivation recommendations.

Specifically, it can be provided, for example, that an operating situation to be analyzed is assigned to at least one operating situation class, for which historical data indicating a preferred behavior of the driver is available, and which are used to determine the recommendation information. This means that operating situations can be grouped into operating situation classes, for example, "driving through a tunnel on a highway" and the like. By looking at driver behavior in the past, particularly also by using statistical methods, preferences for the different operating situation classes can be determined and used to determine the recommendation information. In this case, configurations are also conceivable in which an operating situation can be assigned to different operating situation classes and the preferred behaviors, weighted if necessary, are combined in order to determine recommendation information.

In a specific example, it can be provided that at least one operating situation class describes road sections on which the driver has used or deactivated the autopilot system in the past, and/or road features and/or environmental features for which the driver has activated or deactivated the autopilot system in the past, and/or periods of time in which the driver has activated or deactivated the autopilot system in the past, and/or a number of people in the motor vehicle with which the driver has activated or deactivated the autopilot system in the past, and/or a lane in which the driver has activated or deactivated the autopilot system in the past.

If, for example, a currently traveled road is present on which the technical activatability information indicates that it is technically possible to use the piloted driving function of the autopilot system, analysis of the historical data can nevertheless determine that the use of the piloted driving function is rather undesirable. For example, it may have been analyzed that the driver has deliberately deactivated the piloted driving function several times in corresponding operating situations, for example, when driving through tunnels and/or uphill/downhill gradients (detection, for example, via a navigation system or generally predictive road data), when driving in adverse weather conditions such as rain, snowfall and/or black ice (detection via activity of the windshield wipers, a rain sensor, weather data from the Internet and/or car-to-car information), when driving in the dark (detection, for example, via a light sensor), but also for specific, defined road sections, which, once again, can be tracked, for example, using a navigation system in connection with a GNSS sensor, particularly a GPS sensor. Similarly, the preference of the driver for using the piloted driving function can also depend on the number of people in the motor vehicle if the driver has so far only used the piloted driving function when traveling alone in the motor vehicle. The presence of further people in the motor vehicle can be determined, for example, via seat occupancy sensors, seat belt buckle sensors, and the like.

The behavior of the driver in the past with regard to the use of the piloted driving function in relation to lanes can also be analyzed. For example, if the driver is currently driving in the passing lane of a multi-lane highway and had previously only used the piloted driving function in the far right lane or in a single lane, an activation recommendation or deactivation recommendation can be derived or suppressed accordingly. In this case, the information about lanes can be determined on the basis of data from a camera directed at the area in front of the motor vehicle and/or from corresponding radar sensors and/or on the basis of digital map material from a navigation system (number of lanes).

Finally, the historical data can also describe a temporal preference profile, for example, by statistically analyzing the periods of time in which the driver prefers to use the piloted driving function of the autopilot system. For example, it can be analyzed on which days of the week and/or at what times the piloted driving function is preferably used or not used in order to take this into account when determining the recommendation information. In particular, information from a corresponding timer, particularly a clock, can also be taken into account.

A further specific embodiment of the present disclosure provides that the recommendation information is determined by evaluating activity data describing activities of the driver currently performed or to be performed. If the driver has already started typical secondary activities that would make the use of the piloted driving function particularly meaningful, or if such secondary activities are pending because, for example, a particularly large number of e-mails have been received and/or the calendar of the driver indicates a conference call, the result can be an activation recommendation; similarly, a completion of such secondary activities can lead to a deactivation recommendation. Specifically, it can thus be provided, for example, that in the case of activity data describing an activity not to be performed during vehicle guidance, an activation recommendation is generated. Such activities include, for example, writing/reading short messages, editing calendar entries, carrying out Internet searches, watching a movie, and the like. The activity data can be determined, for example, by recording user inputs on a user interface of the motor vehicle, an interior microphone, particularly the acoustic recording means mentioned, and/or operating data of a mobile device coupled to the motor vehicle, for example, a smartphone.

As a further specific exemplary embodiment, it can be provided that the recommendation information is determined by evaluating attention data describing a current distraction and/or attention of the driver. Specifically, it can be provided that image data showing the eyes of the driver and/or data on the duration of the current journey and/or a time and/or information on the monotony of a road section and/or attention data relating to the distraction, particularly information determined by means of an or the acoustic recording means about a conversation of the driver, are used as attention data relating to fatigue. For example, if the driver shows symptoms of beginning fatigue or lack of concentration, the use of the piloted driving function can seem particularly meaningful. The state of fatigue of the driver can be detected, for example, via an interior camera or its image data, particularly as an eyelid closure detection. A long journey, a late time of day and/or a monotonous route can also indicate signs of driver fatigue and/or lack of concentration. In this case, a coupling to a driver assistance system to recommend breaks, as has already been proposed in the prior art, is particularly advantageous. Driver assistance systems of this type also analyze driver data and derive a break recommendation to be output if the fatigue or attentiveness of the driver makes this appear meaningful. The driver assistance system for the break recommendation can therefore provide useful, already evaluated data for determining the recommendation information.

In particular, animated discussions/conversations with further occupants of the motor vehicle and/or on the telephone can lead to a distraction of the driver. In this case, the use of the piloted driving function can also be particularly meaningful. The beginning of such conversations and/or telephone calls can be detected, for example, using the recording means already mentioned, particularly an interior microphone, seat occupancy sensors and/or belt buckle sensors with respect to the occupants; a telephone call can also be determined via a mobile device coupled to the motor vehicle, particularly a smartphone.

As already mentioned, the configurations mentioned for the determination of recommendation information are preferably used in combination. In an expedient embodiment in combination with recommendation levels, for example, activation recommendations determined on the basis of the activity data and/or driver data can be assigned higher degrees of recommendation than activation recommendations determined on the basis of the historical data. However, assignments to degrees of recommendation which are based more on a general analysis of the operating state, for example, whether the recommendation trigger is short-term or rather permanent and/or which safety criteria are met, are naturally also conceivable.

With regard to the activity data, it must also be noted that a development can provide that the activity and thus an activation recommendation related to it can also be assigned a time period that can be linked to the time information, particularly for the activatability information, in order to determine the activation recommendation and/or to assign it to a recommendation level. For example, if the driver plans to watch or continue to watch a movie, a longer time period of technical availability should also be available in order to make it worthwhile, for example, a time period of at least 10 to 20 minutes. However, an SMS can be written faster, so that, for example, a technical activatability for a period of time of one to three minutes can be sufficient. In this context, an activation recommendation can advantageously comprise background information, so that, for example, a message such as "You could activate the autopilot for about 15 minutes to continue your movie" can be output acoustically. However, if the piloted driving function were only available for a short time, an activation recommendation regarding the movie cannot be determined or can only be determined with a very low degree of recommendation.

In a particularly advantageous development of the present disclosure, it can be provided that the first output element and the second output element are each assigned to different display modules and/or display locations of the display device. It is particularly advantageous to use a first output element which is assigned to a combination display of the motor vehicle, for example, behind the steering wheel, and a second output element which is arranged on a center console or a navigation display, particularly on such a display. In this way, the output elements are not only separated in terms of content (technical availability—driver-related recommendation), but also spatially separated, so that, even with a similar design, the different contents are still accessible to the driver.

Specifically, for example, a backlit and/or colorable and/or supplementable symbol, particularly icon, can be used as the first output element. Thus, for example, a symbol can be used which indicates the activatability state "autopilot system=available" by means of a white color, but it is colored green when the piloted driving function is activated. If the technical activatability information indicates that the piloted driving function is not currently available, for example, no symbol would be displayed. This can be supplemented accordingly if, for example, advance notice is to be given, so that the symbol can be displayed in yellow, for example, and a decreasing bar represents the time information as an interval until activatability is possible. With the first output element and its display, the driver thus has the option of recognizing whether the piloted driving function could in principle be activated, which means that all the technical activation conditions have been met.

In the specific embodiment mentioned above, the second output element can preferably be realized as part of a display, which can also be assigned to the navigation system or can be a multifunctional display. The use of a display that can also be used by a navigation system makes it possible, for example, to highlight road sections on which the use of the piloted driving function is recommended. In addition, for example, a corresponding display of the recommendation information can be represented by the text "piloted driving function: recommended." In particular, such a display is also suitable for the output of time information. It must be noted that it is in principle also conceivable to design at least the visual outputs to be comparable, for example, to output the text "traffic jam pilot: available" on the display if the latter, for example, is only provided as an activation recommendation during a limited period of time, as initially described. A corresponding configuration is also conceivable for a combination with an acoustic output, as described above.

In addition to the method, the disclosure also relates to a motor vehicle, comprising an autopilot system designed for completely automatically guiding the motor vehicle, a display device with a first output element displaying an activatability of the autopilot system, and a second output element, and a control device designed to carry out the method according to the disclosure. All statements relating to the method according to the disclosure can be analogously transferred to the motor vehicle according to the disclosure, with which the already mentioned advantages can thus also be obtained.

In summary, the present disclosure makes it particularly possible to effect greater acceptance and intelligibility of the piloted driving function, to increase the benefit for the driver, and to avoid driver annoyance.

Further advantages and details of the present disclosure will become apparent from the embodiments described below and with reference to the drawings. They show in:

FIG. 1 shows a schematic diagram of a motor vehicle according to the disclosure.

Figure 2:
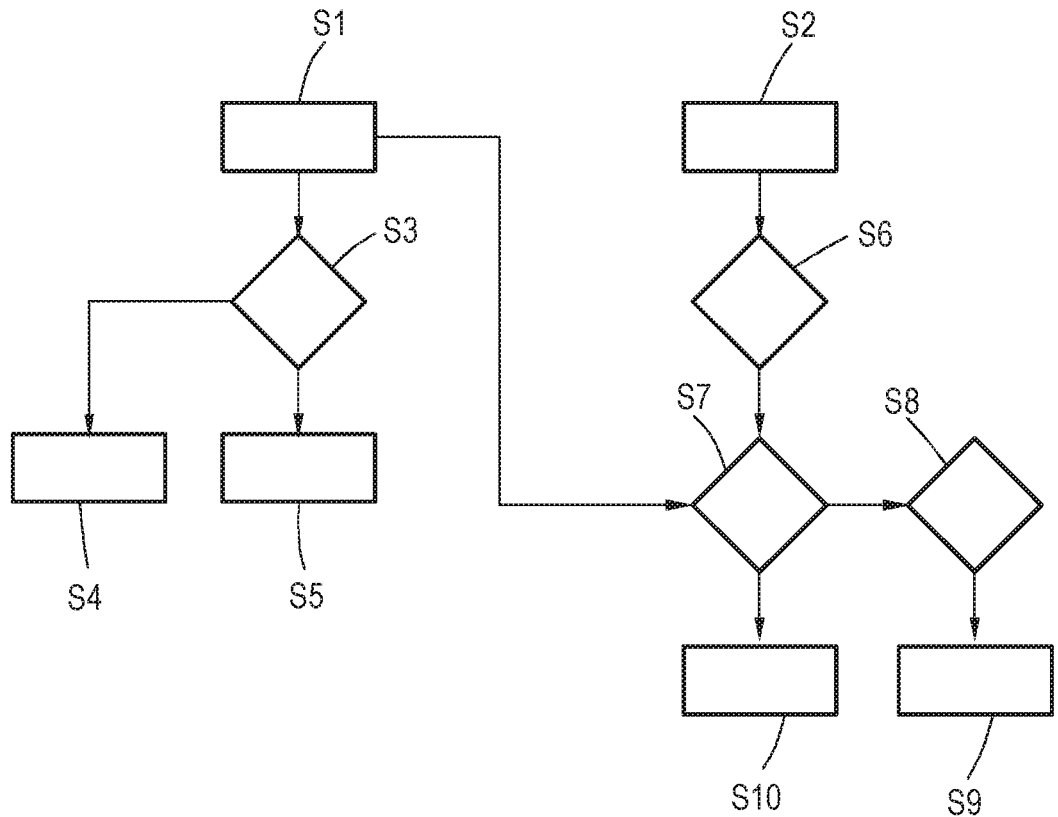
FIG. 2 shows a flowchart of an embodiment of the method according to the disclosure.

FIG. 2 shows a flowchart of an embodiment of the method according to the disclosure.

Figure 3:
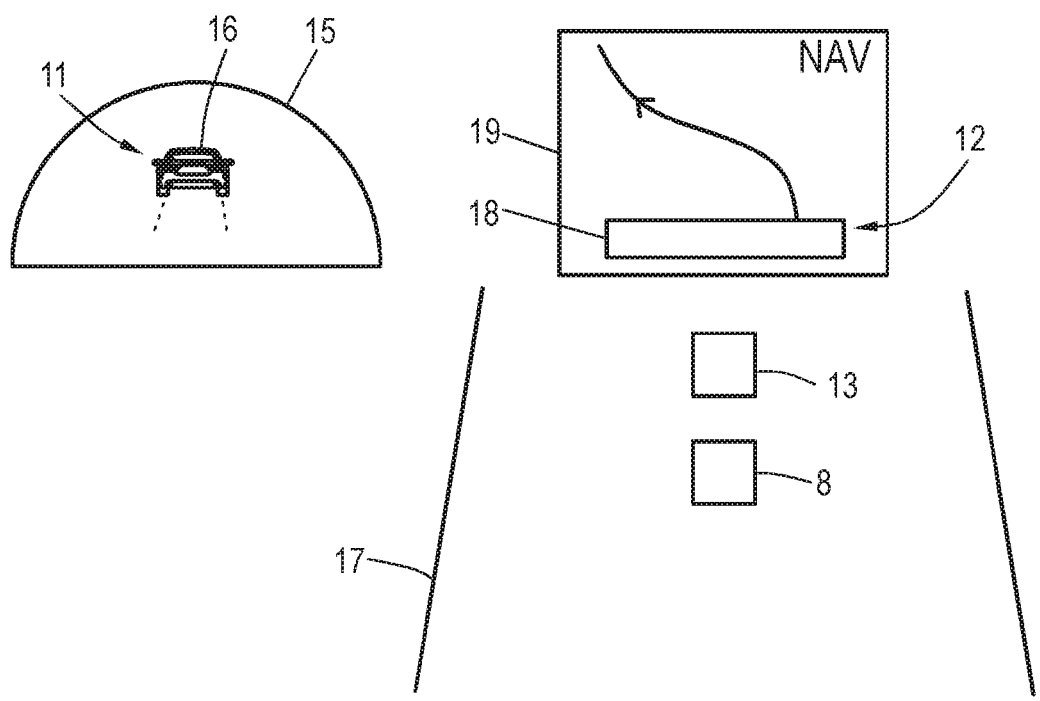
FIG. 3 shows a display concept for the method according to the disclosure.

FIG. 3 shows a display concept for the method according to the disclosure.

Figure 4:
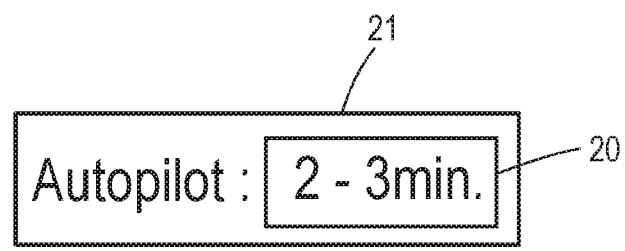
FIG. 4 shows an option for integrating the display of time information.

FIG. 4 shows an option for integrating the display of time information.

Figure 5:
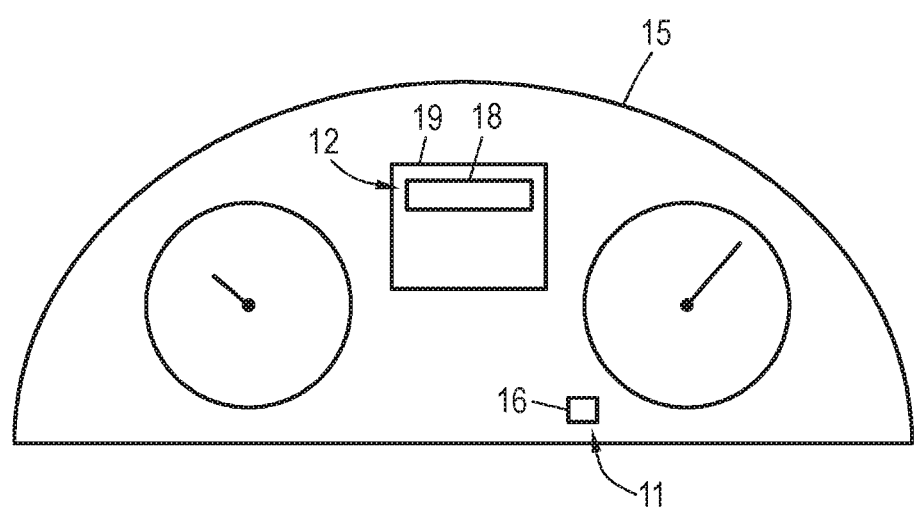
FIG. 5 shows a further display concept for the method according to the disclosure.

FIG. 5 shows a further display concept for the method according to the disclosure.

Figure 6:
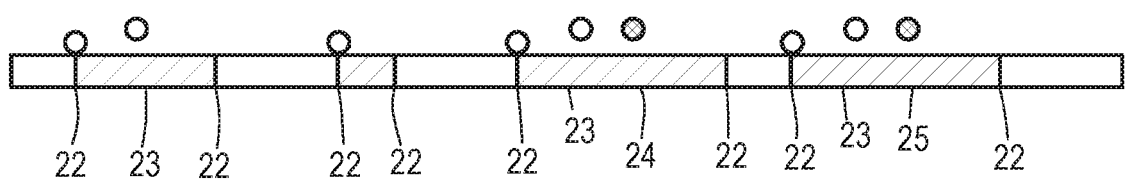
FIG. 6 shows a chronological sequence for display events.

FIG. 6 shows a chronological sequence for display events.

FIG. 1 shows a schematic diagram of a motor vehicle 1 according to the disclosure. The motor vehicle 1 has an autopilot system 2 which is designed for completely automatically guiding the motor vehicle 1 within specific system boundaries described by system boundaries information, and which can be activated or deactivated by a driver via corresponding operating means (not depicted in any detail) when available. The motor vehicle also has a navigation system 3 with a corresponding geodetic position sensor 4, a plurality of environmental sensors 5, interior sensors 6, in the present case comprising an interior camera 7 and a recording means 8 designed as an interior microphone, and further vehicle systems 9, also comprising intrinsic sensors which can provide the operating state data of the motor vehicle in the current operating situation. Driving situation data, which also describe the current operating situation, are provided particularly by the navigation system 3 and its digital map material as well as the environmental sensors 5 or the evaluation of their sensor data. For outputting information to a driver, the motor vehicle 1 also has a display device 10, which in the present case comprises a plurality of output elements 11, 12, and 13, which shall be described in more detail below. Finally, a control device 14 is provided, which can also include a control unit of the autopilot system 2 and is designed to carry out the method according to the disclosure.

This shall be explained in more detail using an embodiment in FIG. 2. Two types of information regarding the activation/deactivation of the autopilot system 1 are determined and updated parallel in a cyclical manner.

In a step S1, as is basically known in the prior art, a determination is made of a technical activatability information describing the basic technical activatability based on the system boundaries information, wherein ultimately, as is generally known, the current operating situation and the upcoming operating situations, insofar as predictive road data are known in sufficient quantity, for example, on the basis of the environmental sensors 5 and the navigation system 3, are checked to determine whether the range of application, described by the system boundaries of the system boundaries information, of the piloted driving function of the autopilot system 2 is present. This is precisely indicated by the technical activatability information for road sections for which the technical activatability has been determined. Hereto, the operating situation is described by operating data of the motor vehicle 1 and driving situation data, which can contain a multiplicity of information, particularly with regard to the currently traveled and upcoming route (predictive road data), the weather conditions and the traffic conditions. It must be noted that the motor vehicle 1 can particularly also have a communication device (not depicted in any detail) in order to communicate on the Internet and/or with other motor vehicles in order to obtain corresponding driving situation data.

In a step S2, further information is determined parallel to step S1, namely, in addition to the technical activatability information, a driver-related recommendation information that describes an activation recommendation and/or a deactivation recommendation based on the preferences of the driver with regard to the autopilot system 2 and the driver state related to the vehicle guidance. This means that in step S2, it is anticipated whether an activation of the piloted driving function, which, for example, can be a traffic jam pilot, a highway pilot, or the like, appears meaningful to the driver based on the preferences and/or the current state of said driver.

Both the activatability information and the recommendation information are additionally determined with time information which ultimately describes the extent of the road sections, for which the technical activatability is present or an activation is recommended. In particular, the time information can indicate a time and/or an interval until the activatability/activation or deactivation recommendation and/or a spatial and/or temporal duration of the activatability/activation recommendation.

In any case, background information is also determined as part of the recommendation information, which describes a reason for the activation recommendation or deactivation recommendation, as shall be explained below by way of example. In addition, recommendations, particularly at least activation recommendations, are also assigned to recommendation levels indicating a degree of recommendation, to which different types of output can be assigned. At some point in time, several recommendations can be present.

Different types of data are included as driver data for the determination of the recommendation information. At first, these are the historical data describing the driver behavior in the past, wherein in step S2, an operating situation to be analyzed is assigned to at least one operating situation class, for which historical data indicating a preferred behavior of the driver are available, and which are used to determine the recommendation information. In particular, the historical data describe cases in which the driver has deliberately activated or deactivated the piloted driving function. For example, despite technical activatability, the piloted driving function may be undesirable for the driver when driving through tunnels, on uphill and/or downhill gradients, in adverse weather conditions, in the dark or for specific defined road sections, which can be mapped accordingly via operating situation classes. Corresponding driving situation data and operating data arise, as already described, particularly from the vehicle systems 9, the environmental sensors 5, and the navigation system 3. Predictive road data, particularly from the navigation system 3, can be used, for example, to recognize tunnel passages and uphill/downhill gradients; adverse weather conditions can be determined from the operation of windshield wipers and/or from sensor data from a rain sensor and/or from weather data from the Internet and/or car-to-car information. Sensor data of a light sensor can describe the brightness outside the motor vehicle, while defined road sections are determined from the navigation system 3, taking into account the position sensor 4.

Other operating situation classes can relate, for example, to the number of people in the motor vehicle. If, for example, drivers are present who prefer to use piloted driving functions when there are several people in the motor vehicle, this can be determined accordingly, wherein the presence of passengers in the motor vehicle can be detected, for example, via seat occupancy sensors, belt buckle sensors, and the like. Preferences with regard to specific lanes can also be mapped, wherein the currently traveled lane is detected, for example, by a camera or radar sensors as environmental sensors 5 directed at the area in front of the motor vehicle 1, while the number of existing lanes can be determined, for example, from data from the navigation system 3 and/or also from the camera directed at the area in front of the motor vehicle.

Further driver data, which are used in step S2 to determine the recommendation information, comprise activity data describing activities of the driver currently performed or to be performed. If, for example, it is determined that the driver has already started typical secondary activities that make the use of the piloted driving function particularly meaningful, a corresponding activation recommendation can be generated. Secondary activities that should not be carried out by the driver during vehicle guidance comprise, for example, writing and/or reading short messages, editing calendar entries, Internet searches and/or watching a movie. Corresponding operating data of the motor vehicle can be inferred, for example, from operating actions by the driver, information from a coupled mobile device, particularly smartphones, and/or the acoustic recording means 8. In this case, an activity can be assigned a period of time which, in order to determine an activation recommendation per se and/or a degree of recommendation, is set in the context of a time information of the activity information, which describes the duration of the technical activatability. For example, it can be determined whether the activity can be performed within the availability interval in a meaningful manner.

The recommendation information is also determined by evaluating driver attention data which describe a current distraction and/or attention of the driver. In this case, it can be observed particularly, for example, on the basis of the data from the interior camera 7 whether the driver has symptoms of beginning fatigue or lack of concentration, which make the use of the piloted driving function appear meaningful. The state of fatigue can be determined, for example, by means of an image analysis of the eyes of the driver (eyelid closure), wherein further indicators are a long travel time, a late hour and a monotonous route (data from the navigation system 3); input data of a driver assistance system are particularly preferably used as a further vehicle system 9 for the break recommendation. A distraction can also be present by a conversation with a telephone partner and/or an occupant, in which case the acoustic recording means 8 (interior microphone), seat occupancy sensors, belt buckle sensors and/or a coupled mobile device (smartphone) can once again be used for detection.

Especially the evaluation of the driver data and the activity data can also result in activation recommendations with a higher degree of recommendation, which relate to a current, short-term and/or rather safety-critical operating state and can be added to a lower-level activation recommendation, for example, for a road section. Such recommendations can also be described as longer-term and actuality-related recommendations.

The technical activatability information, which was determined in step S1, is output by means of a first output element 11 of the display device 10 of the motor vehicle 1. In a step S3, it is checked whether or when there will be a technical activatability of the autopilot system 2, so that, for example, an activatability can be indicated in step S4 and a non-activatability can be indicated in step S5. An activatability information output in step S4 can also refer to a technical activatability that will soon be possible, for example, in that the time information is used and also output on the first output element 11.

With regard to the recommendation information, it is first checked in a step S6 whether there is an activation recommendation and/or a deactivation recommendation for the current and/or an upcoming road section. However, if this is the case, it is first checked in a step S7 whether the technical activatability is also available for the corresponding road section. If this is not the case in step S7, a check is carried out in step S8 as to whether the current operating situation permits at least one recommendable driving intervention by the driver, which leads to the establishment of the technical activatability. Such a driving intervention can comprise, for example, a lane change or a speed reduction in order to establish the technical activatability very soon if the piloted driving function is only permissible to be used in specific speed ranges or in specific lanes. However, it can also be checked in advance whether to recommend, for example, the change of road class, for example, from a country road to a highway, in order to use the autopilot, for example, in the case of a highway pilot. A corresponding alternative route can then be determined and output by means of the navigation system 3 of the motor vehicle 1. If at least one driving intervention of the driver establishes the technical activatability and there is also an activation recommendation, corresponding driver information describing the driving intervention is in any case generated and output using the output element 13, which in this case is also used as a second output element and designed as an acoustic output means. In particular, a voice output such as "To activate the highway pilot, please first switch to the right lane/reduce the speed/ choose an alternative route via the highway" can be provided. This driver information is output in a step S9.

Activation recommendations and deactivation recommendations can be output in a step S10 via the second output elements 12, 13, wherein the output element 12 is a visual output element and the output element 13 is an acoustic output means. In this case, an activation recommendation or a deactivation recommendation is expediently output at the beginning of a road section, to which it relates, and depending on the recommendation level, for example, limited to a predetermined period of time, in this case five seconds, or permanent. The determined background information is also output, preferably by means of a voice output, via the second display element 13 designed as an acoustic output means. For example, an activation recommendation relating to a longer road section can be visually displayed permanently and supplemented by an activation recommendation with a higher degree of activation, which is output particularly acoustically. This results, for example, in outputs such as "Would you like to activate the highway pilot now? You could use it to comfortably and safely process your emails" or "Would you like to deactivate the highway pilot now? We will be entering a tunnel shortly." (In the latter case, the historical data determined that the driver is reluctant to use the highway pilot in tunnels.)

A first display concept for the visual output of the technical activatability information and the recommendation information is shown by way of example in FIG. 3. A symbol 16, which can be backlit, is integrated into an instrument cluster 15 arranged behind the steering wheel and used as the first output element 11. If the symbol 16 is backlit in green, the piloted driving function is activated; if it is backlit in white, it can be activated, and if it is not visible, no technical activatability is available. A yellow backlight in connection with a decreasing bar display (due to the time information) can be used in the case of an upcoming activatability.

Spatially separated in the area of a center console 17, the second output element 12 is provided as a text field 18 of a display 19, on which data from the navigation system 3 can also be arranged. This output of activation recommendations/deactivation recommendations is supplemented by the acoustic output means as the second output element 13, which can ultimately be arranged anywhere. At this point, it must also be noted that in the present case, the driver can also respond verbally to an acoustic output, for which purpose the recording means 8 (interior microphone) is used to record a voice response from the driver, which can then be evaluated for a corresponding control information for the autopilot system 2. The acoustic output means (output element 13) and the acoustic recording means 8 (interior microphone) can also form parts of a hands-free device.

FIG. 4 finally shows an integration of time information 20 into a representation 21. For example, the frame of the display "2 to 3 minutes" can be green in case of an activated autopilot and remaining activation duration, and yellow in case of an upcoming activatability/activation recommendation. Of course, this can also be further described by additional output components.

In the further display concept shown in FIG. 5, at least the first output element 11 and the visual second output element 12 are integrated, but spatially separated, within the instrument cluster 15, since a display 19 of the navigation system or a multifunction display is also realized in that location.

Finally, FIG. 6 schematically shows a possible time sequence for outputting the technical activatability and activation recommendations/deactivation recommendations. In the shaded time ranges, the technical availability is provided in accordance with the activatability information, so that at least at times 22, the first output element 11 is controlled to indicate this change, possibly also in preparation thereof as shown in FIG. 3. The times 23 indicate activation recommendations of low activation levels, which, for example, are derived from the historical data and relate to a longer road section. The corresponding, preferably only visual output can be displayed permanently for the duration of the activation recommendation. By way of example, an activation recommendation with a higher degree of recommendation, i.e., a second recommendation level, is added at time 24, for example, because the driver has started or wants to start an activity that is carried out more safely with the automated driving function activated.

Thus, at time 24—in addition to the permanent display of the other activation recommendation—said further activation recommendation is output at least acoustically, for example: "If you activate the autopilot now, you can engage in the activity."

By way of example, time 25 marks a deactivation recommendation because it indicates the time when, for example, a tunnel will be entered.

The invention claimed is:

1. A method for operating a motor vehicle, wherein the motor vehicle comprises an autopilot system and a display device, the method comprising:
    determining, by the autopilot system, technical activatability information based on an operating situation described by driving situation data and/or operating state data of the motor vehicle and system boundaries information describing a range of application of the autopilot system;
    displaying, by a first output element of the display device, an activatability of the autopilot system according to the technical activatability information;
    determining, by the autopilot system, recommendation information based on the operating situation and preferences in relation to the autopilot system or driver data describing a status of a driver of the motor vehicle in relation to a vehicle guidance; and
    displaying, by a second output element of the display device, an activation recommendation or a deactivation recommendation according to the recommendation information,
    wherein the autopilot system is designed for automatically guiding the motor vehicle.

2. The method according to claim 1, further comprising displaying the activation recommendation for road sections within the range of application.

3. The method according to claim 1, wherein the recommendation information comprises a recommendation level describing a degree of recommendation, the method further comprising:
    determining to display using the second output element based on the recommendation level;
    determining control parameters for displaying based on the recommendation level; and
    displaying, by the second output element, the activation recommendation based on the control parameters.

4. The method according to claim 3, further comprising:
    determining that the activation recommendation is based on a driver-related suitability of a road section;
    assigning a first recommendation level to the activation recommendation;
    determining a second activation recommendation based on a current activity and/or a current state of the driver; and
    assigning a second recommendation level to the second activation recommendation,
    wherein the activation recommendation is a road section-related activation recommendation,
    wherein the second activation recommendation is an actuality-related activation recommendation, and
    wherein the first recommendation level is lower than the second recommendation level.

5. The method according to claim 4, further comprising:
    displaying the activation recommendation at least at a beginning of a road section to which it refers.

6. The method according to claim 5, further comprising:
    displaying the second activation recommendation in a predetermined period of time; and
    outputting, by the second output element, the second activation recommendation acoustically, wherein the second output element comprises an acoustic output device.

7. The method according to claim 6, wherein the predetermined period of time is 5 seconds.

8. The method according to claim 6, further comprising:
    in response to outputting the second activation recommendation acoustically, recording a response from the driver by an acoustic recording device of the motor vehicle; and
    deriving control information for activating or deactivating the autopilot system based on the response.

9. The method according claim 1, further comprising:
    determining the technical activatability information indicates that the autopilot system is not available and the recommendation information indicates the activation recommendation;
    in response to determining the technical activatability information, determining a driving intervention by the driver that leads to an establishment of the activatability of the autopilot system; and
    outputting driver information describing the driving intervention by the second output element and/or a further output element of the motor vehicle.

10. The method according to claim 9, wherein the driving intervention includes a lane change and/or a change of road class and/or a speed reduction.

11. The method according to claim 10, further comprising:
    determining that the driving intervention is the change of road class;
    in response to determining that the driving intervention is the change of road class, determining a route comprising a target road class; and
    outputting the route by a navigation system of the motor vehicle.

12. The method according to claim 1, wherein the recommendation information comprises background information describing a reason for the activation recommendation and/or the deactivation recommendation, and wherein the method further comprises outputting the activation recommendation or the deactivation recommendation with the background information.

13. The method according to claim 1, further comprising determining the recommendation information by evaluating historical data describing driver behavior in a past and/or by evaluating activity data describing current or future activities of the driver and/or by evaluating attention data describing a current distraction and/or attention of the driver.

14. The method according to claim 1, further comprising:
    assigning the operating situation to an operating situation class;

determining a preferred behavior of the driver based on historical data of the operating situation class; and determining the recommendation information based on the preferred behavior.

15. The method according to claim 13, further comprising:

determining that the activity data indicates an activity to be performed without the vehicle guidance; and generating the activation recommendation.

16. The method according to claim 13, wherein the attention data relates to a fatigue of the driver and comprises image data showing eyes of the driver, or a duration of a current journey, or a time and/or information on a monotony of a road section, or the current distraction, or information about a conversation of the driver determined by the acoustic recording device.

17. A motor vehicle, comprising an autopilot system designed for automatically guiding the motor vehicle, a display device with a first output element and a second output element, and a control device, wherein the motor vehicle is configured to:

determine, by the autopilot system, technical activatability information based on an operating situation described by driving situation data and/or operating state data of the motor vehicle and system boundaries information describing a range of application of the autopilot system;

display, by the first output element, an activatability of the autopilot system according to the technical activatability information;

determine, by the autopilot system, recommendation information based on the operating situation and preferences in relation to the autopilot system or driver data describing a status of a driver of the motor vehicle in relation to a vehicle guidance; and display, by the second output element, an activation recommendation or a deactivation recommendation according to the recommendation information.

* * * * *